United States Patent
Krauss

(10) Patent No.: US 9,569,281 B1
(45) Date of Patent: Feb. 14, 2017

(54) DYNAMIC SYNCHRONIZATION OBJECT POOL MANAGEMENT

(71) Applicant: International Business Machines Corporation, Armonk, NY (US)

(72) Inventor: Kirk J. Krauss, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/826,100

(22) Filed: Aug. 13, 2015

(51) Int. Cl.
G06F 9/46 (2006.01)
G06F 9/52 (2006.01)

(52) U.S. Cl.
CPC ...................... G06F 9/52 (2013.01)

(58) Field of Classification Search
None
See application file for complete search history.

(56) References Cited

U.S. PATENT DOCUMENTS

| | | | |
|---|---|---|---|
| 6,411,983 B1 * | 6/2002 | Gallop | G06F 9/52 718/104 |
| 6,836,887 B1 | 12/2004 | Such | |
| 7,124,266 B1 | 10/2006 | Harmer et al. | |
| 7,353,515 B1 * | 4/2008 | Ton | G06F 9/52 718/100 |
| 7,469,329 B2 * | 12/2008 | Kuczynski | G06F 17/30312 707/999.101 |
| 7,681,197 B1 * | 3/2010 | Kinnear | G06F 9/526 710/200 |
| 7,774,569 B1 | 8/2010 | Chatterjee et al. | |
| 8,060,880 B2 * | 11/2011 | Cherem | G06F 9/524 710/20 |
| 2002/0138544 A1 * | 9/2002 | Long | G06F 9/52 718/107 |

(Continued)

OTHER PUBLICATIONS

Engler et al; "RacerX: Effective, Static Detection of Race Conditions and Deadlocks"; SOSP'03 ACM Oct. 19-22, 2003. (ENGLER_2003.pdf; pp. 1016).*

(Continued)

*Primary Examiner* — Hiren Patel
(74) *Attorney, Agent, or Firm* — Lee Law, PLLC; Christopher B. Lee

(57) ABSTRACT

A number of synchronization objects simultaneously usable during runtime by a group of threads within a multi-threaded execution environment is predicted by a processor that manages synchronization object allocations within the multi-threaded execution environment. A synchronization object pool is allocated with the predicted number of synchronization objects, each initialized with a deployment state of undeployed and an acquisition state of unlocked. Over time, the deployment state is changed between deployed and undeployed in response to requests by threads to deploy and undeploy the synchronization objects. The acquisition state is independently controlled as the synchronization objects are acquired and released by the threads. The allocated number of synchronization objects within the synchronization object pool is adjusted during the runtime in response to determined deployment rates of the allocated number of synchronization objects.

14 Claims, 5 Drawing Sheets

(56) References Cited

U.S. PATENT DOCUMENTS

| | | | | |
|---|---|---|---|---|
| 2002/0138661 | A1* | 9/2002 | Hayward | G06F 9/52 719/315 |
| 2004/0088573 | A1* | 5/2004 | Jeyaram | G06F 9/52 713/167 |
| 2005/0010729 | A1* | 1/2005 | Silvera | G06F 9/52 711/150 |
| 2005/0289546 | A1* | 12/2005 | Shpeisman | G06F 9/3004 718/100 |
| 2007/0074222 | A1* | 3/2007 | Kunze | G06F 9/526 718/107 |
| 2009/0271793 | A1* | 10/2009 | Rostedt | G06F 9/526 718/103 |
| 2010/0250809 | A1* | 9/2010 | Ramesh | G06F 9/526 710/200 |
| 2011/0126202 | A1* | 5/2011 | Krauss | G06F 9/485 718/102 |
| 2014/0366036 | A1* | 12/2014 | Vemulapati | G06F 9/52 718/106 |
| 2016/0098303 | A1* | 4/2016 | Balakrishnan | G06F 9/5016 718/102 |

OTHER PUBLICATIONS

Dr. Cliff Click, A Lock-Free Wait-Free Hash Table, Unshackle the Power of Java, Presentation: Azul Systems, 2007, pp. 1-55, Stanford University, Published online at: http://web.stanford.edu/class/ee380/Abstracts/070221_LockFreeHash.pdf.

Azadeh Farzan, et al., Compositional Bitvector Analysis for Concurrent Programs With Nested Locks, Proceedings of the 17th International Conference on Static Analysis, 2010, pp. 253-270, Springer-Verlag Berlin, Heidelberg, Germany.

Author Unknown, CreateMutexEx function, Microsoft WindowsDev Center Webpage, Printed from website on Aug. 13, 2015, pp. 1-3, Microsoft Corporation, Published online at: https://msdn.microsoft.com/en-us/library/windows/desktop/ms682418%28v=vs.85%29.aspx.

Author Unknown, Using Mutex Objects, Microsoft Windows Dev Center Webpage, Printed from website on Aug. 13, 2015, pp. 1-3, Microsoft Corporation, Published online at: https://msdn.microsoft.com/en-us/library/windows/desktop/ms686927%28v=vs.85%29.aspx.

William Pugh, Skip Lists: A Probabilistic Alternative to Balanced Trees, Article, 1990, pp. 1-8, University of California, Davis, Published online at: http://web.cs.ucdavis.edu/~amenta/w04/skiplists.pdf.

Author Unknown, What level of locking granularity is good in concurrent data structures?, stackoverflow.com Webpage/site, Printed from website on Aug. 13, 2015, pp. 1-3, Stack Overflow, Published online at: http://stackoverflow.com/questions/13739770/what-level-of-locking-granularity-is-good-in-concurrent-data-structures.

Author Unknown, Why is lockless concurrency such a big deal (in Clojure)?, stackoverflow.com Webpage/site, Printed from website on Aug. 13, 2015, pp. 1-3, Stack Overflow, Published online at: http://stackoverflow.com/questions/1360729/why-is-lockless-concurrency-such-a-big-deal-in-clojure.

* cited by examiner

DYNAMIC SYNCHRONIZATION OBJECT POOL MANAGEMENT

BACKGROUND

The present invention relates to synchronization of executing threads. More particularly, the present invention relates to dynamic synchronization object pool management.

Computing applications may be written as uniprocessor applications or may be written as multi-threaded applications. Each thread of a multi-threaded application may be executed by a different processor or may be allocated different intervals of time for sequential execution on a single processor.

SUMMARY

A computer-implemented method includes predicting, by a processor that manages synchronization object allocations within a multi-threaded execution environment, a number of synchronization objects simultaneously usable during runtime by a group of threads within the multi-threaded execution environment; allocating a synchronization object pool of the predicted number of synchronization objects, each initialized with a deployment state of undeployed and an acquisition state of unlocked; changing over time the deployment state between deployed and undeployed in response to requests by threads to deploy and undeploy the synchronization objects, where the acquisition state is independently controlled as the synchronization objects are acquired and released by the threads; and adjusting during the runtime the allocated number of synchronization objects within the synchronization object pool in response to determined deployment rates of the allocated number of synchronization objects.

A system that performs the method and a computer program product that causes a computer to perform the method are also described.

DETAILED DESCRIPTION

Figure 1:
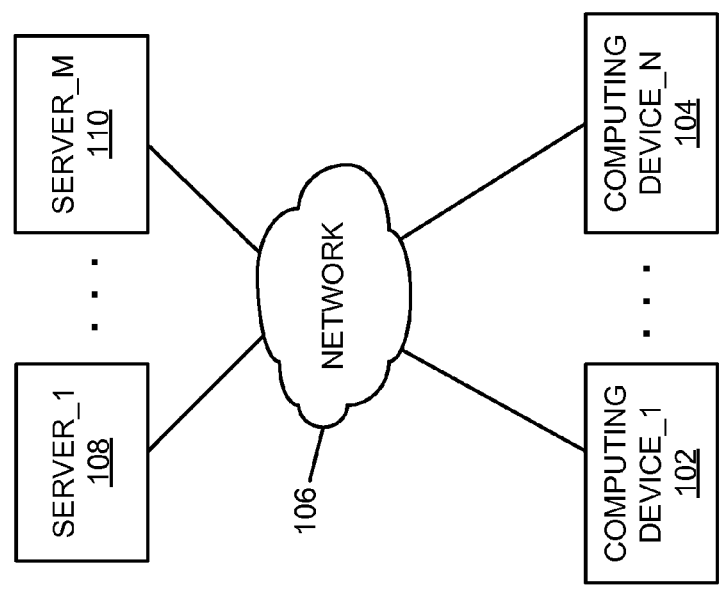
FIG. 1 is a block diagram of an example of an implementation of a system for dynamic synchronization object pool management according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic synchronization object pool management. The present technology solves a recognized problem with prior technologies related to synchronization objects (i.e., locks) that resulted in either synchronization-induced bottlenecks or unsafe parallelism involving resource management within multi-threaded computing environments. The present technology operates by providing a new approach to synchronization that removes synchronization-induced bottlenecks and that improves safety and granularity of parallel processing within multi-threaded computing environments by use of predictive analysis and demand-driven synchronization object quantity adjustments. The improved granularity may be achieved with the present technology because the technology described herein provides for the management of synchronization objects in sufficient quantities to protect many individual resources, such as individual objects of a class, without incurring wasted overhead of significant numbers of unnecessary synchronization objects. In a conventional execution environment that lacks the present technology, where a synchronization object protects a less fine-grained data structure, for example all objects of a class simultaneously, any thread's access to one object of the class may delay other threads in their attempts to access other objects of the same class. These delays in conventional technologies impose inefficiency in thread performance, and the present technology solves this recognized problem. The technology described herein adjusts synchronization object allocations over time to provide more effective utilization of available system resources (e.g., memory, processor occupancy, etc.), in view of varying resource demands over time, than may otherwise be possible. As such, the technology described herein improves computing performance within complex computing environments by solving several issues that were recognized to exist in prior technologies.

The present technology operates by programmatically predicting, by a processor that manages synchronization object allocations within a multi-threaded execution environment, a number of synchronization objects simultaneously usable during runtime by a group of threads within the multi-threaded execution environment. A synchronization object pool is allocated with the predicted number of synchronization objects, with each synchronization object initialized with a deployment state of undeployed and an acquisition state of unlocked. Over time, the deployment state is changed between deployed and undeployed in response to requests by threads to deploy and undeploy the synchronization objects. The acquisition state is independently controlled as the synchronization objects are acquired and released by the threads. The allocated number of synchronization objects within the synchronization object pool is adjusted during the runtime in response to determined deployment rates of the allocated number of synchronization objects.

For purposes of the description herein, a multi-threaded execution environment is understood to include a processing platform that supports execution of multiple concurrent application-level threads, such as one or more of a cloud or grid computing system, or any other system, subsystem, or system component that provides execution support for multiple threads that may be executed within one or more of an operating system, an executing process a computer program, a software component, a service, a device driver, a firmware component, an application, or any other form of executable programmatic component that may be executed by one or more hardware processors. A multi-threaded execution environment may further include a virtual machine environment provided by one or more hardware processors, where software runs on a virtual machine that supports multi-threaded execution. Further, a multi-threaded execution environment may include a physical hardware environment, where software runs on the physical hardware that supports multi-threaded execution. A number of synchronization objects simultaneously usable during runtime by threads within a multi-threaded execution environment may include a set of synchronization objects usable to ensure thread safety for the threads that may execute within such a multi-threaded execution environment as defined herein.

Deployment rates may include time-varying measures related to runtime utilization or real-time demand for synchronization objects, such as demand above or below a threshold percentage of locks in a pool, or demand relative to one or more baseline values or other metric values. Demand above a percentage, baseline, or other metric may provide an indication to increase the pool size. Demand below a percentage, baseline, or other metric may provide an indication to decrease the pool size. Any change in synchronization object demand over time, with respect to a defined rate, percentage, baseline, or other metric, may provide an indication to increase or decrease the pool size according to the particular demand. Determination of synchronization object deployment rates may include determination of synchronization object deployment or utilization at one or more instants during a run, for comparison with one or more percentages, baselines, or other metrics, and may utilize information other than a determination based on a literal rate calculation.

The technology described herein involves two primary aspects: predictive deployment and management of a synchronization object pool; and dynamic demand-based size adjustment of the synchronization object pool. First, the present technology predictively manages a pool of synchronization objects (e.g., critical sections, semaphores, mutexes, spin locks, etc.) such that each may be dynamically deployed for use in protecting one or more objects, and such that each may be subsequently undeployed by being returned to the pool. Secondly, the present technology tracks a deployment state of each synchronization object (e.g., undeployed and deployed) and in certain implementations tracks an associated acquisition state of each synchronization object (e.g., unlocked and locked). The present technology utilizes this information to dynamically adjust the size of (e.g., number of synchronization objects in) the synchronization object pool. Once an initial predictively-sized synchronization object pool has been established, the number of allocated synchronization objects in the pool may be dynamically increased or decreased, over time, as system demands change over time. The adjustments may occur at runtime as applications or services start and stop sharing resources, as software components load and unload, and/or as inbound workload changes.

It should be noted that the description below uses the term "lock" in certain locations as a synonym for "synchronization object" for ease of description. However, it should be understood that use of the term "lock" as a synonym for "synchronization object" is not limiting the description to a particular style of implementation of a synchronization object, and that as a result the term lock refers to any form of "synchronization object" within the scope of the present description, such as but not limited to those described by example above.

At the beginning of a system run, or during a system run, locks may be allocated, initialized, and designated to be undeployed members of a synchronization object pool (alternatively "pool" hereinafter). The locks may be provided by the operating system (OS-provided) or may be implemented by developers of applications, services, device drivers, and other components. Alternatively, the locks may be a combination of OS-provided locks and component developer-implemented locks, as appropriate for a given implementation.

Regarding predictive initial determination and subsequent adjustment of the number of locks to be allocated within a pool to optimize memory requirements, the number of locks in the pool may be set to be equal to a number of objects of classes that may require protection via locks in the pool. Alternatively, to improve memory utilization, a more optimum number of locks in the pool may be determined by performing predictive analytics based upon the characteristics of the applications/threads that are intended to utilize or are actually utilizing the pool.

For example, the following Equation (1) may be applied to determine a maximum number of locks a thread may acquire at one time (e.g., Maximum Locks Held Simultaneously by a Thread):

$$\text{Maximum Locks Held Simultaneously by a Thread} = (\text{Maximum Locks Acquirable Simultaneously Per Routine}) \times (\text{Maximum Call Chain Depth}) \quad \text{Equation (1):}$$

Within Equation (1), the term "Maximum Locks Acquirable Simultaneously Per Routine" represents a maximum number of locks that may be simultaneously acquired per routine within a given thread. Further, the term "Maximum Call Chain Depth" represents a maximum depth of a call chain that may include such a routine. These values may be determined by programmatic analysis of code produced by a code build process, or otherwise as appropriate for a given implementation.

Using the result from Equation (1) (e.g., Maximum Locks Held Simultaneously by a Thread), Equation (2) below may be applied to determine a maximum number of objects that may require simultaneous protection (e.g., Maximum Simultaneous Objects):

$$\text{Maximum Simultaneous Objects} = (\text{Number of Threads}) \times (\text{Maximum Locks Held Simultaneously by a Thread}) \quad \text{Equation (2):}$$

Within Equation (2), the term "Number of Threads" represents a number of threads that may be active within an executing process (i.e., an instance of a computer program loaded into an address space and associated with an execution context). Further, the term "Maximum Locks Held Simultaneously by a Thread" represents a maximum number of locks that a thread may acquire at once. As with the above parameters, these values may be determined by programmatic analysis of code within a code build, or otherwise as appropriate for a given implementation.

Using the result from Equation (2) (e.g., Maximum Simultaneous Objects), the number of locks to create (e.g., Num_Locks, either initially or as adjusted over time) may be identified programmatically to equate to the determined maximum number of objects that may require simultaneous lock protection.

It should be noted that the Equation (1) above may result in an overestimation, and static analysis or other code analysis techniques may be employed to refine/improve that estimate of the maximum number of locks a thread may acquire at one time. It should additionally be noted that the above values may change over the course of the system run, so that the pool may be updated to contain more or fewer locks, as appropriate to improve runtime efficiency/performance and resource utilization, as described above and in more detail below. Changeable values may include each of the number of threads (e.g., Number of Threads) value and the maximum number of locks a thread may acquire at one time (e.g., Maximum Locks Held Simultaneously by a Thread) value. These values may change in response to the changing resource requirements that result as software components are loaded and unloaded within a process. As such, the present technology may perform iterative determinations of pool size and utilization over time, and may perform appropriate dynamic (e.g., run-time) adjustments of the pool size to accommodate real-time demand for pooled synchronization objects.

Regarding tracking of utilization of synchronization objects within a given pool, a data structure associated with the pool, such as one or more pool management bit vectors or structures of other forms may be created. In certain implementations, a deployment state bit vector may be used to track the deployment states of locks within a given pool. As an alternative, a second data structure (e.g., a bit array or other structure) may be used, either separately or as an additional field associated with each deployment state bit, to indicate the acquisition state of any given lock within a given pool. As an alternative, an additional acquisition state bit vector or integer vector may be utilized to track acquisition states of locks. As an alternative to tracking the acquisition state of the locks at the pool level, the locks themselves may be managed as locked or unlocked within the memory space allocated to the respective locks.

From the pool management perspective, the deployment states of locks within the pool may be one of deployed and undeployed. The acquisition state of the locks may be one of locked (potentially also with a recursion count) and unlocked.

Regarding implementation of either of the state data structures described above (e.g., deployment and acquisition), as one possible example, if a pool is associated with an object class, then a state data structure (e.g., bit) may be associated with the object. The state data structure may be a member of the object or a member of a set of state data structures (e.g., a bit vector) associated with the class. A pool identifier may identify the respective pool associated with the respective bit or bit vector. The set of state data structures associated with the class may be of adjustable size, such that the number of locks in the pool may be increased or decreased over time based upon demand as objects of the class are created and destroyed, respectively. To implement the dynamic size adjustment, the data structure may be implemented as a reallocatable array or other structure of bits.

To improve readability of the remaining description, a bit vector or bit array will be utilized for purposes of example, with the understanding that the description below applies at least equally to other types of in-memory data structures, as described above. As such, use of bit arrays/vectors for purposes of the additional examples and description below does not limit the description herein to any particular form of data structure.

For purposes of example, the reallocatable array of bits may be implemented by allocating a new bit array of the target adjusted size (e.g., larger or smaller), such as by use of a memory allocation or reallocation routine (e.g., malloc( ), realloc( ) or a similar routine), and the active contents of the current bit array may be migrated to the new bit array. As such, where a bit array is to be increased in size, the new bit array may be allocated to be larger than the current bit array, and the current locks represented within the bit array may be likewise represented within the new bit array (e.g., without any changes in bit positions, etc.). Alternatively, where the bit array is to be decreased in size, the new bit array may be allocated to be smaller than the current bit array, the current locks represented within the bit array may be represented in condensed form to remove unused lock bit positions, and the condensed bit array may be moved to the new bit array. The migration of the active contents of the current bit array to the new bit array may be performed by mapping the deployed state bits of the current bit array to new bits within the new bit array, and setting the deployed state within the respective bit positions (e.g., as deployed or as undeployed).

For a bit array size reduction, unused bit positions may be omitted from the mapping. As such, where it is determined that the currently-allocated number of synchronization objects is in excess of what is being used, the number of synchronization objects and the associated pool management state bits may be reduced in number. A mapping between the bits in the array and the deployed locks protecting objects associated with those bits may be maintained, for example, by maintaining bits indicating a deployed state in ordinal positions in a bit array that are identical to ordinal positions of protected objects in an array of objects. Other mappings may serve for objects arranged in other (non-array) data structures.

For a bit array size increase, all bits of the current bit array may be directly mapped into identical bit positions within the new bit array to expedite processing. The respective bit states may also be directly copied into identical bit positions within the new bit array to further reduce real-time processing.

Regarding logic preference for bit values, it should be noted that either active-high or active-low logic values may be used, as appropriate for a given implementation. Using active-high logic, the default value may be cleared (e.g., zero (0)). Alternatively, using active-low logic, the default value may be set (e.g., one (1)), depending upon the logic preference within the particular system, to indicate an undeployed state of a lock. When a lock is deployed for use in protecting an individual object of a class, then a specific bit within a vector specifically corresponding to that class, may be set to indicate that the lock is deployed (e.g., set to one (1) for active-high logic, or alternatively cleared to zero (0) using active-low logic, again respectively and with respect to the logic preference within the particular system, to indicate the deployed state for the lock).

In implementations that associate an acquisition state bit with each deployment state bit, when an object update is detected, the corresponding bit for that object within the acquisition state bit vector may first be checked via an atomic operation that may also then set the bit if the check reveals it to be clear for acquisition of the lock. As such, the atomic check/set represents an indivisible/uninterruptible operation. The lock bit in the acquisition state bit vector (or in the memory allocated for the lock itself) may be subsequently cleared again when the update of the object is completed. As such, within such an implementation, the pool management data structure may also serve as at least a portion of the underlying lock mechanism itself.

With further reference to the predictive determination and adjustment of the number of locks to be allocated within a pool to optimize memory requirements, where locks are created based on predictive programmatic computations and/or static analysis as described above, one or more of the following processing variations may be utilized as appropriate for a given implementation. For example, the creation and use of a synchronization object pool (lock pool) for the protection of objects of a class may eliminate performance bottlenecks caused by conventional lock contention that may occur when a single shared lock is used to protect all of the objects of the class. The lock pool may be originally sized, and/or resized, to fit with the number of objects of the class for which simultaneous protection is provided. Routines that implement the present technology may thus be designed to reduce contention for locks and data overhead required by the implementation.

All threads that attempt to access an object of a class associated with a synchronization object pool may collectively safely do so using routines designed for use with the pool. These routines may include one or more routines associated with each of lock deployment, acquisition, release, and undeployment. A lock deployment routine may accept as input a handle or pointer to a specified object of the class and may set a state bit associated with that object, in a bit vector associated with the pool, to indicate lock deployment. A lock acquisition routine may ensure that a lock is deployed for protection of a particular object, such as a handle or pointer that may arrive as input to the routine within some implementations, before attempting to acquire the lock. As the thread that has invoked the lock acquisition routine takes ownership of the lock, the routine may arrange for an acquisition state bit and the related state data to be set accordingly. A lock release routine may accept as input an indication as to whether further protection of the object is expected by any thread, for example if the lock is being held at certain times only during processing performed within the context of a component that is unloading or about to be unloaded. If no further use of the lock is expected, then the lock release routine may undeploy the lock by clearing the bit associated with that object. A lock undeployment routine may determine whether the lock is held and, if not, may undeploy the lock by clearing that bit.

A routine invoked to acquire a lock for protection of an individual object may first determine whether a lock has already been deployed to protect the object. If no lock has been deployed to protect the object, the routine may deploy a lock from a specified pool on demand and may acquire/lock that deployed lock, so that lock-protected processing may continue without additional delays that may otherwise be imposed if the locks were conventionally assigned to protect all objects of a class, as opposed to protecting individual objects within a class as described herein. The deployment and acquisition of the lock may be performed together, again via an atomic operation or under the protection of some other pool management lock specific to the pool (and, in some implementations, the class). As such, on systems that support multiple memory updates in an atomic operation, two memory locations may be updated by the atomic operation to deploy and acquire the lock: the deployment state indicator designating the lock as deployed; and the separate acquisition state indicator designating the lock as locked. On systems that support only single-address atomic operations, the bits representing the deployment and acquisition state may be arranged to share a common address, or other synchronization techniques may be applied to ensure thread-safe access to those bits as appropriate for a given implementation.

A routine invoked to acquire a lock for protection of an individual object may determine that the lock has already been deployed to protect the respective object, and if so, the routine may further determine whether another thread is holding the lock. If another thread is holding the lock, the routine may wait for the lock to be released. Alternatively, if the lock is deployed and available (e.g., not locked), the routine may acquire/lock the lock, again so that processing may continue under the lock's protection. Another routine may subsequently be invoked to release/unlock the lock and to determine whether the lock may also be undeployed (e.g., if no other usage of that lock by the current thread is foreseen in the short term), such as by use of a flag passed to a lock releasing routine.

It should be noted that the respective routines may be implemented as procedure calls (e.g., methods), by application programming interface (API) functions, or otherwise as appropriate for a given implementation. The routine(s) and/or API functions may be implemented at an operating system (OS) level. The operating system may provide API functionality to create locks as pool members and/or to assign locks to pools, to deploy the locks in the pool, to un-deploy those locks, and to perform other management functions (e.g., acquire lock after a prospective wait, try-acquire with no wait, release, increment/decrement recursion count, change owning thread, etc.).

Any number of pools may be created, again within memory space limits. In some implementations, a single pool may serve to provide thread-safe resource access among all of the threads that execute in the context of a single executing process. The resources protected by a single pool may include resources utilized by an entire application, a component of an application, or one or more specific object classes or subclasses. As such, synchronization object pools may be implemented granularly as appropriate for the given implementation. A pool may be identified by a handle, an ordinal value, or any other suitable identifier.

In view of the description above, many possibilities exist for tracking of locks and for dynamic size adjustment of the data structures (e.g. bit vectors, etc.) used to manage synchronization objects within a pool. All such possibilities are considered to be within the scope of the present subject matter.

It should be noted that conception of the present subject matter resulted from recognition of certain limitations associated with thread safety. For example, it was observed that within complex highly-parallelized systems synchronization objects, alternatively referred to as locks, tend to be relatively few in number (e.g., a few thousand operating-system-provided synchronization objects) in relation to the number of data structures the synchronization objects protect (e.g., hundreds of thousands, millions, etc.). It was further observed that as a result of the limited number due to resource limitations, these synchronization objects are typically applied to all of the data structures of a given class. However, it was determined that if a thread (e.g., thread "A") needs to update one member of the class, as a consequence of the class-level granularity of synchronization objects, a separate thread (e.g., thread "B") cannot update another member/object of the class type at the same time, even in cases where there is no actual overlap of the data owned by those individual class members/objects. For example, if the thread "A" adds event-specific data structures, representing observations of entities, to lists and queues, and the thread "B" cleans up the lists and those queues as the events "expire," it was observed that prior technologies that locked all elements of all queues during an update imposed unnecessary wait states involving the two threads. These unnecessary wait states decrease application performance and may even affect overall system performance. It was further determined that for these reasons, synchronization by use of prior technologies has become increasingly limited, both as systems grow and as the systems involve increased parallelism, with respect to utilization of available system resources. From these several observations and determinations, it was further determined that a new form of synchronization was desirable that provides for the runtime on-demand application of synchronization objects to individual members/objects of a class, rather than to a class as a whole, and that predictively and on demand dynamically adjusts allocations of synchronization objects over time to enhance utilization of available system resources relative to synchronization object use. As such, the present subject matter improves complex parallel processing within complex systems by reducing synchronization-induced bottlenecks and unsafe parallelism, thereby increasing granularity of object synchronization and safe parallelism, each with dynamic resource allocations in accordance with demand-driven behavior that may improve both system performance and resource exploitation, as described above and in more detail below. As such, improved parallel processing may be obtained through use of the present technology.

The dynamic synchronization object pool management described herein may be performed in real time to allow prompt determinations of changes to the allocated number of synchronization objects within a pool and to perform pool management over time using predictive analytics and demand-driven synchronization object allocation and deployment. For purposes of the present description, the term "real time" shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define, are well understood by those skilled in the art.

FIG. 1 is a block diagram of an example of an implementation of a system 100 for dynamic synchronization object pool management. A computing device_1 102 through a computing device_N 104 communicate via a network 106 with several other devices. The other devices include a server_1 108 through a server_M 110.

As will be described in more detail below in association with FIG. 2 through FIG. 6, the computing device_1 102 through the computing device_N 104 may each provide automated dynamic synchronization object pool management. The automated dynamic synchronization object pool management is based upon predictive analysis of synchronization object utilization, with dynamic adjustments of synchronization object pool sizes to improve execution efficiency and to reduce memory/processor utilization. The present technology may be implemented at a user computing device or server device, or in hardware, firmware, application software, service software, or operating system software on one or more of these devices, in any combination thereof, as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

Figure 2:
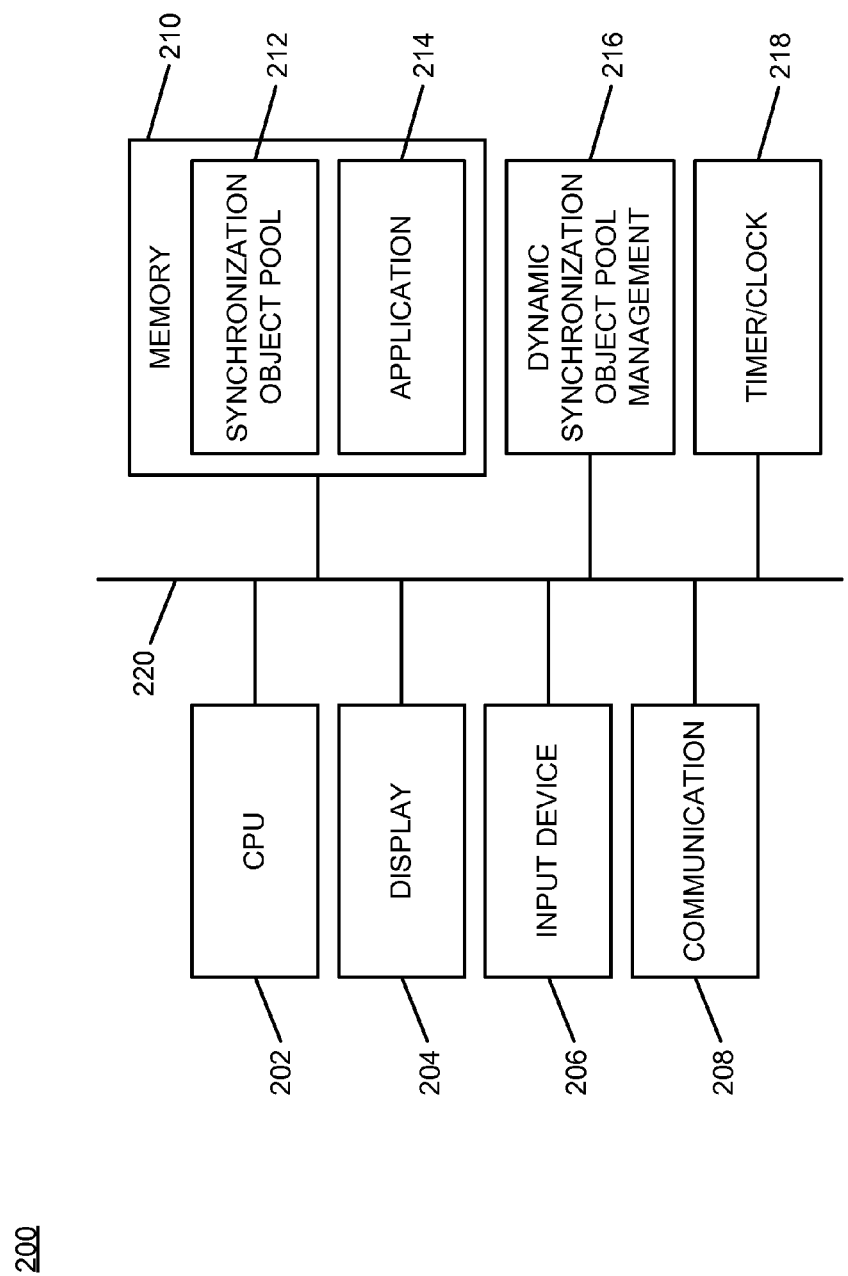
FIG. 2 is a block diagram of an example of an implementation of a core processing module capable of performing dynamic synchronization object pool management according to an embodiment of the present subject matter.

FIG. 2 is a block diagram of an example of an implementation of a core processing module 200 capable of performing dynamic synchronization object pool management. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and that all such variations are within the scope of the present subject matter.

Further, the core processing module 200 may provide different and complementary processing of synchronization objects and synchronization object pools in association with each implementation. As such, for any of the examples below, it is understood that any aspect of described functionality with respect to any one device in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a synchronization object pool storage area 212 that stores one or more dynamically-managed synchronization object pools in association with the core processing module 200. The memory 210 also includes an application area 214 that provides storage and execution space for one or more multi-threaded applications, and storage and execution space for one or more objects instantiated by the respective multi-threaded application(s). The objects instantiated by the respective multi-threaded application(s) within the application area 214 may be protected using locks provided and managed within the synchronization object pool storage area 212. One or more dynamically-managed synchronization object pools may be implemented as part of one or more multi-threaded applications themselves, or they may be implemented via separate services, operating system-provided features, or loadable components or modules.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A dynamic synchronization object pool management module 216 is also illustrated. The dynamic synchronization object pool management module 216 provides analytical processing for predictive creation of appropriately-sized synchronization object pools according to predicted utilization of locks, and also provides ongoing demand-driven pooled synchronization object adjustments for the core processing module 200, as described above and in more detail below. The dynamic synchronization object pool management module 216 may include a prediction engine component that may execute independently of, and in some cases prior to, a process that will use a synchronization object pool of a predicted size, along with a dynamic synchronization object pool management runtime component that may execute as part of such a process. The dynamic synchronization object pool management module 216 implements the automated dynamic synchronization object pool management of the core processing module 200.

It should also be noted that the dynamic synchronization object pool management module 216 may form a portion of other circuitry described without departure from the scope of the present subject matter. Further, the dynamic synchronization object pool management module 216 may alternatively be implemented as an application, service, or operating system provided feature stored within the memory 210. In such an implementation, the dynamic synchronization object pool management module 216 may include instructions executed by the CPU 202 for performing the functionality described herein. The CPU 202 may execute these instructions to provide the processing capabilities described above and in more detail below for the core processing module 200. The dynamic synchronization object pool management module 216 may form a portion of an interrupt service routine (ISR), a portion of an operating system, a portion of a web server or browser application, or a portion of any application or system software without departure from the scope of the present subject matter.

A timer/clock module 218 is illustrated and used to determine timing and date information, such as wait times for releases of locks, as described above and in more detail below. As such, the dynamic synchronization object pool management module 216 may utilize information derived from the timer/clock module 218 for information processing activities associated with the dynamic synchronization object pool management described herein.

The CPU 202, the display 204, the input device 206, the communication module 208, the memory 210, the dynamic synchronization object pool management module 216, and the timer/clock module 218, are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application-specific integrated circuits (ASICs), processors, antennas, and/or discrete integrated circuits and components for performing communication and electrical control activities associated with the respective modules. Additionally, the modules may include system level, interrupt service routine level (ISR-level), and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

FIG. 3 through FIG. 6 described below represent example processes that may be implemented by devices, such as the core processing module 200, to perform the automated dynamic synchronization object pool management associated with the present subject matter. It should be understood that the example processes described below are different from "executing process" as described above, and instead represent higher-level processing methodologies. As such, while the term "process" is overloaded (e.g., used differently within different contexts) within the present application, a person of ordinary skill may readily distinguish the different uses of the term herein based upon the clarification provided above. Many other variations on the example processes are possible and all are considered within the scope of the present subject matter. The example processes may be performed by modules, such as the dynamic synchronization object pool management module 216 and/or executed by the CPU 202, associated with such devices. It should be noted that, for ease of illustration, time out procedures and other error control procedures are not illustrated within the example processes described below. However, it is understood that all such procedures are considered to be within the scope of the present subject matter. Further, the described processes may be combined, sequences of the processing described may be changed, and additional processing may be added or removed without departure from the scope of the present subject matter.

Figure 3:
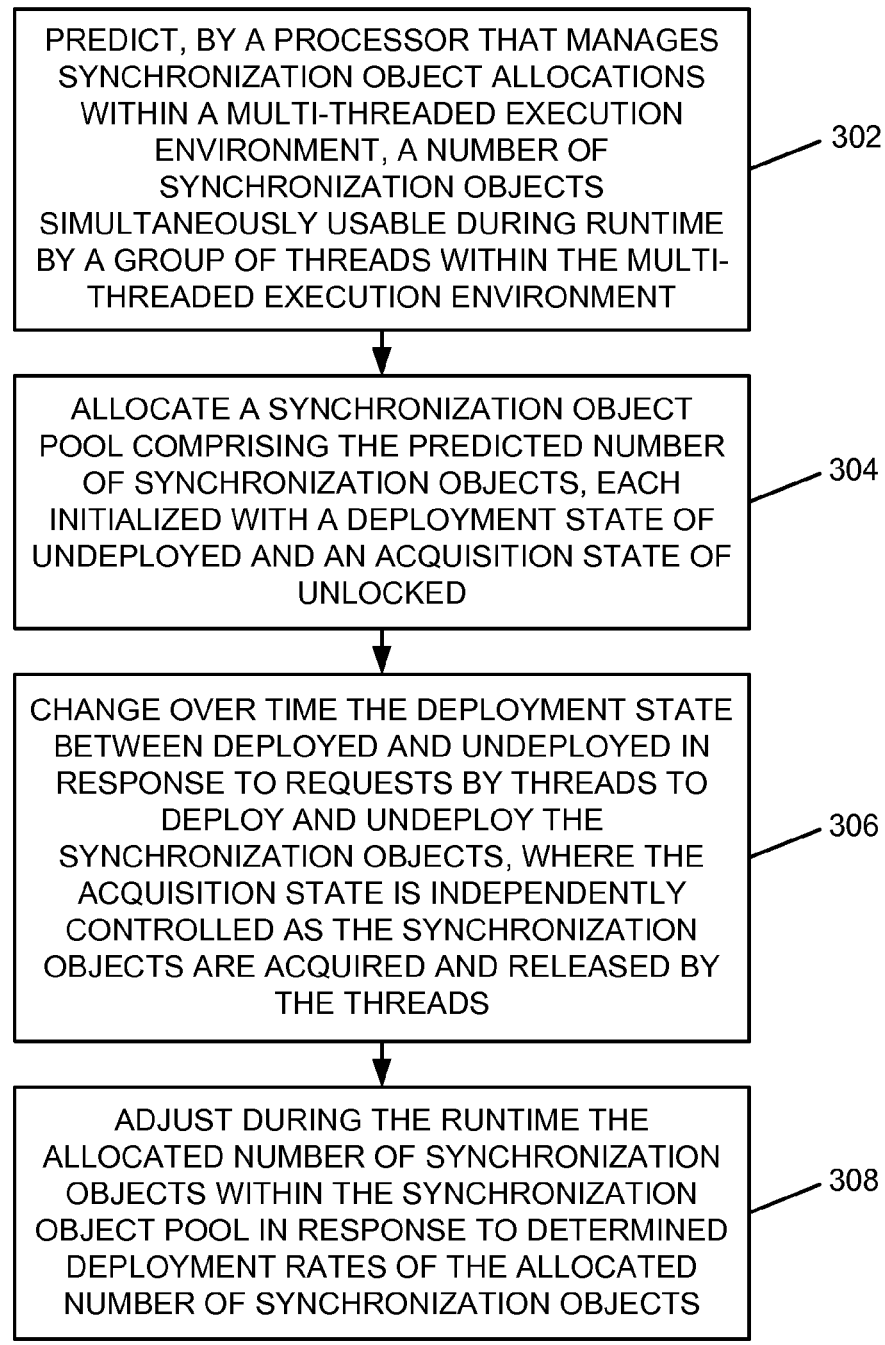
FIG. 3 is a flow chart of an example of an implementation of a process for dynamic synchronization object pool management according to an embodiment of the present subject matter.

FIG. 3 is a flow chart of an example of an implementation of a process 300 for dynamic synchronization object pool management. The process 300 represents a computer-implemented method of practicing the technology described herein. At block 302, the process 300 predicts, by a processor that manages synchronization object allocations within a multi-threaded execution environment, a number of synchronization objects simultaneously usable during runtime by a group of threads within the multi-threaded execution environment. At block 304, the process 300 allocates a synchronization object pool comprising the predicted number of synchronization objects, each initialized with a deployment state of undeployed and an acquisition state of unlocked. At block 306, the process 300 changes over time the deployment state between deployed and undeployed in response to requests by threads to deploy and undeploy the synchronization objects, where the acquisition state is independently controlled as the synchronization objects are acquired and released by the threads. At block 308, the process 300 adjusts during the runtime the allocated number of synchronization objects within the synchronization object pool in response to determined deployment rates of the allocated number of synchronization objects.

Figure 4:
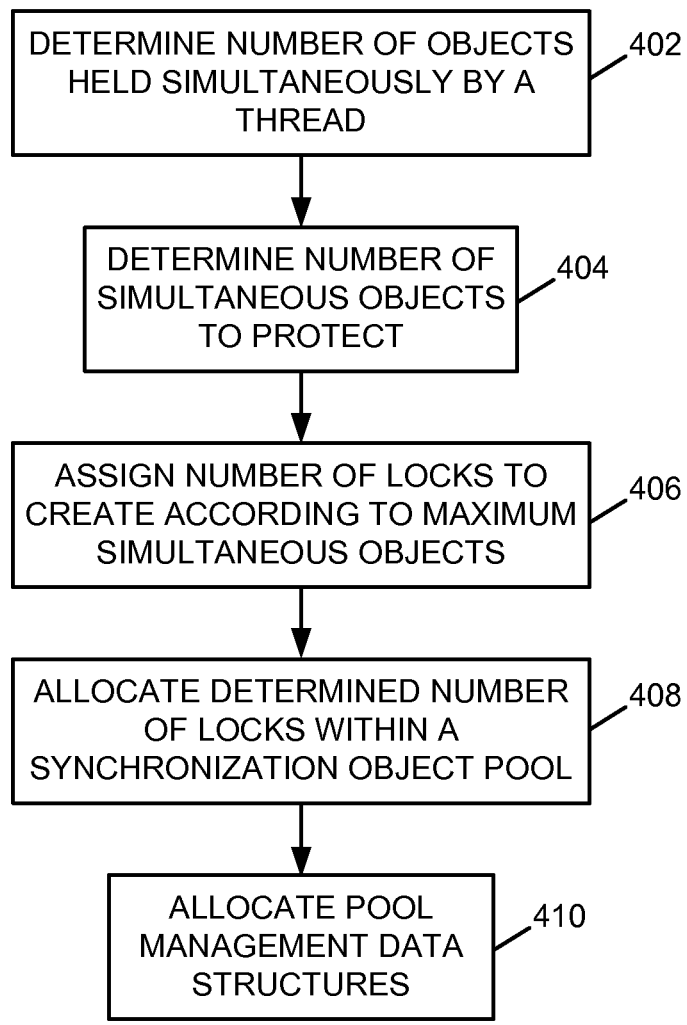
FIG. 4 is a flow chart of an example of an implementation of a process for dynamic synchronization object pool allocation according to an embodiment of the present subject matter.

FIG. 4 is a flow chart of an example of an implementation of a process 400 for dynamic synchronization object pool allocation. The process 400 represents a computer-implemented method of performing the subject matter described herein. The process 400 may be invoked responsive to a system start up, on demand, or otherwise as appropriate for a given implementation. In response to being invoked, the process 400 begins processing to analyze code of at least one application that executes within a multi-threaded execution environment. At block 402, the process 400 determines a number of objects that may be held simultaneously by a thread. The determination of the number of objects that may be held simultaneously by the thread allows the process 400 to determine a maximum number of synchronization objects per thread in accordance with an identified maximum number of synchronization objects per routine and a maximum depth of a call chain comprising each routine within the at least one application. At block 404, the process 400 determines a maximum number of simultaneous objects to protect. Determining the maximum number of simultaneous objects to protect may involve predicting the number of synchronization objects in accordance with the determined maximum number of synchronization objects per thread and a determined number of threads simultaneously executable within the at least one application. At block 406, the process 400 assigns a number of locks to create according to the maximum number of simultaneous objects to protect. Some implementations may employ alternate techniques to determine the maximum number of simultaneous objects to protect. For example, some implementations may perform code analysis to obtain a predicted count of a number of objects to protect and may thus ensure that the synchronization object pool size is sufficient to allow protection of those objects by all threads simultaneously executable within the at least one application.

At block 408, the process 400 allocates the determined number of locks within a synchronization object pool. As described above, the acquisition state indicators may be allocated within a separate data structure or as a paired indicator associated with each deployment state indicator used to manage deployment of each synchronization object, or alternatively, the acquisition state indicators may be implemented within the locks themselves. At block 410, the process 400 allocates one or more pool management data structure(s) (e.g., a deployment state bit vector), and allocates the additional acquisition state data structure (and acquisition state bit vector) if appropriate for the given implementation. As such, the process 400 maintains a pool management data structure comprising, for each allocated synchronization object within the synchronization object pool, a deployment state indicator that identifies the deployment state of the respective allocated synchronization object as one of deployed and undeployed. The process 400 may further maintain within the pool management data structure, for each allocated synchronization object within the synchronization object pool, an acquisition state indicator that identifies the acquisition state of the respective allocated synchronization object as one of locked and unlocked, as appropriate for the given implementation. It should be noted that, as described above, the acquisition state data structure/indicators may alternatively be provided at an operating system (OS) level or otherwise as appropriate for a given implementation. As described in more detail below, the allocated number of synchronization objects and the allocated number of data structure indicators may be adjusted over time in accordance with changes in demand for the pooled synchronization objects.

Figure 5:
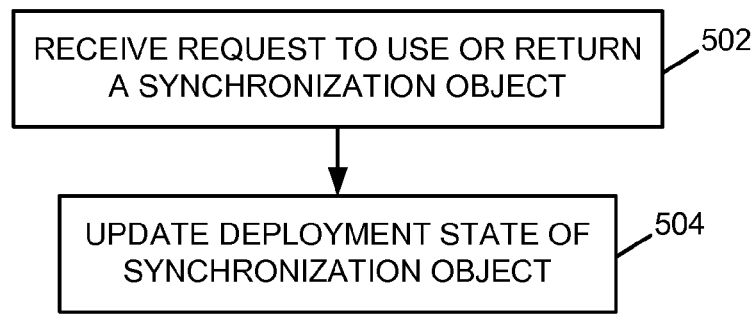
FIG. 5 is a flow chart of an example of an implementation of a process for updating deployment states of synchronization objects within a synchronization object pool according to an embodiment of the present subject matter.

FIG. 5 is a flow chart of an example of an implementation of a process 500 for updating deployment states of synchronization objects within a synchronization object pool. The process 500 represents a computer-implemented method of performing the subject matter described herein. At block 502, the process 500 receives a request to use or return a synchronization object from or back to a synchronization object pool, respectively. At block 504, the process 500 updates a deployment state of a synchronization object that is either deployed from the synchronization object pool or returned to the synchronization object pool to deploy or undeploy, respectively. It should be noted that the acquisition state of the synchronization object may be independently changed between locked and unlocked as the thread acquires and releases a deployed synchronization object.

Figure 6:
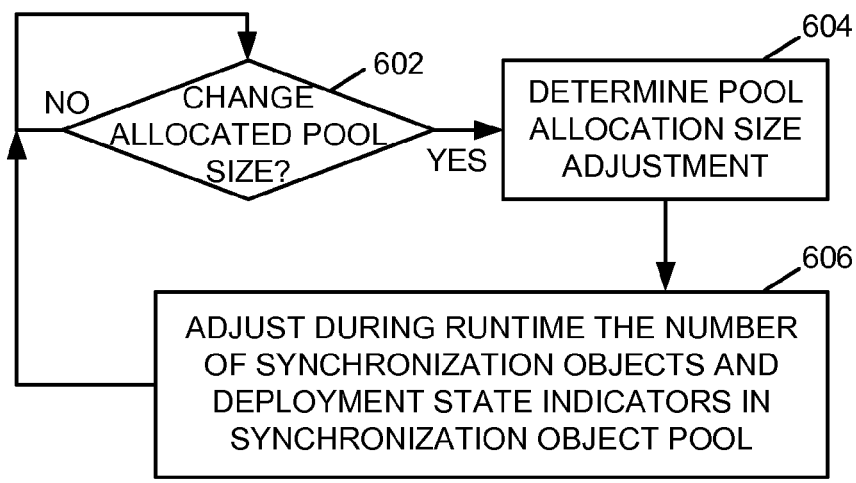
FIG. 6 is a flow chart of an example of an implementation of a process for dynamic synchronization object pool size adjustment according to an embodiment of the present subject matter.

FIG. 6 is a flow chart of an example of an implementation of a process 600 for dynamic synchronization object pool size adjustment. The process 600 represents a computer-implemented method of performing the subject matter described herein. The process 600 may be invoked routinely or otherwise as appropriate for a given implementation to adjust the allocated number of synchronization objects within the synchronization object pool. It should also be noted that the process 600 may iteratively adjust the allocated number of synchronization objects within the synchronization object pool over time to increase and decrease, respectively, the allocated number of synchronization objects in accordance with a quantity of synchronization objects in use by the threads. At decision point 602, the process 600 makes a determination whether to change the allocated synchronization object pool size. As described above, the pool size may be increased or decreased in accordance with the runtime use of the allocated synchronization objects. For example, where a set or percentage of allocated synchronization objects are undeployed for extended periods of time, the undeployed synchronization objects may be removed from the pool to reduce memory consumption of unutilized locks and state indicators. Alternatively, where it is determined that all or virtually all locks remain deployed for large percentages of time, or where an increased demand for locks is detected or expected, additional synchronization objects may be allocated as pool members.

In response to determining at decision point 602 to change the allocated synchronization object pool size, the process 600 determines a pool allocation size adjustment at block 604, which as described above may include a determination of an increased number or decreased number of synchronization objects. At block 606, the process 600 adjusts during runtime the number of synchronization objects and deployment state indicators in the synchronization object pool. The process 600 may dynamically adjust the number of allocated synchronization objects, and may dynamically adjust the number of deployment state indicators within a pool management data structure during runtime responsive to adjusting during the runtime the allocated number of synchronization objects within the dynamic synchronization object pool. The adjusted number of deployment state indicators within the pool management data structure correlates with the adjusted number of synchronization objects within the dynamic synchronization object pool. The process 600 returns to decision point 602 and iterates responsive to determinations to adjust the allocated pool size as described above.

As such, the process 600 performs an analysis, which may include use of static analysis, control flow analysis, synchronization object deployment rate analysis, or probabilistic analysis, to predict a number of synchronization objects simultaneously usable during runtime by threads within a multi-threaded execution environment, and allocates the predicted number of synchronization objects within a synchronization object pool along with pool-level object management bits. The process 600 performs runtime adjustment of the allocated number of synchronization objects within the dynamic synchronization object pool according to the runtime demand for the synchronization objects within the pool.

As described above in association with FIG. 1 through FIG. 6, the example systems and processes provide dynamic synchronization object pool management. Many other variations and additional activities associated with dynamic synchronization object pool management are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, microcontrollers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    predicting, by a processor that manages synchronization object allocations within a multi-threaded execution environment, a number of synchronization objects simultaneously usable during runtime by a plurality of threads within the multi-threaded execution environment, comprising:
        analyzing code of at least one application;
        determining a maximum number of synchronization objects per thread in accordance with an identified maximum number of synchronization objects per routine and a maximum depth of a call chain comprising each routine within the at least one application; and
        predicting the number of synchronization objects in accordance with the determined maximum number of synchronization objects per thread and a determined number of threads simultaneously executable within the at least one application;
    the computer-implemented method further comprising:
    allocating a synchronization object pool comprising the predicted number of synchronization objects, each initialized with a deployment state of undeployed and an acquisition state of unlocked;
    changing over time the deployment state between deployed and undeployed in response to requests by threads to deploy and undeploy the synchronization objects, where the acquisition state is independently controlled as the synchronization objects are acquired and released by the threads; and
    adjusting during the runtime the allocated number of synchronization objects within the synchronization object pool in response to determined deployment rates of the allocated number of synchronization objects, comprising iteratively adjusting the allocated number of synchronization objects within the synchronization object pool over time to increase and decrease, respectively, the allocated number of synchronization objects in accordance with a quantity of synchronization objects in use by the threads.

2. The computer-implemented method of claim 1, where changing over time the deployment state between deployed and undeployed in response to requests by the threads to deploy and undeploy the synchronization objects comprises, for each deployment of a synchronization object from the synchronization object pool:
    receiving a request from a thread to use the synchronization object from the synchronization object pool;

updating the deployment state of the synchronization object to deployed; and independently changing the acquisition state of the synchronization object between locked and unlocked as the thread acquires and releases the synchronization object.

3. The computer-implemented method of claim 1, further comprising maintaining a pool management data structure comprising, for each allocated synchronization object within the synchronization object pool, a deployment state indicator that identifies the deployment state of the respective allocated synchronization object as one of deployed and undeployed.

4. The computer-implemented method of claim 3, further comprising maintaining within the pool management data structure, for each allocated synchronization object within the synchronization object pool, an acquisition state indicator that identifies the acquisition state of the respective allocated synchronization object as one of locked and unlocked.

5. The computer-implemented method of claim 1, further comprising dynamically adjusting a number of deployment state indicators within a pool management data structure during the runtime responsive to adjusting during the runtime the allocated number of synchronization objects within the synchronization object pool, where the adjusted number of deployment state indicators within the pool management data structure correlates with the adjusted number of synchronization objects within the synchronization object pool.

6. A system, comprising:
a memory; and
a processor that manages synchronization object allocations within a multi-threaded execution environment programmed to:
predict a number of synchronization objects simultaneously usable during runtime by a plurality of threads within the multi-threaded execution environment, comprising the processor being programmed to:
analyze code of at least one application;
determine a maximum number of synchronization objects per thread in accordance with an identified maximum number of synchronization objects per routine and a maximum depth of a call chain comprising each routine within the at least one application; and
predict the number of synchronization objects in accordance with the determined maximum number of synchronization objects per thread and a determined number of threads simultaneously executable within the at least one application;
the processor being further programmed to:
allocate a synchronization object pool comprising the predicted number of synchronization objects, each initialized with a deployment state of undeployed and an acquisition state of unlocked;
change over time the deployment state between deployed and undeployed in response to requests by threads to deploy and undeploy the synchronization objects, where the acquisition state is independently controlled as the synchronization objects are acquired and released by the threads; and
adjust during the runtime the allocated number of synchronization objects within the synchronization object pool in response to determined deployment rates of the allocated number of synchronization objects, comprising the processor being programmed to iteratively adjust the allocated number of synchronization objects within the synchronization object pool over time to increase and decrease, respectively, the allocated number of synchronization objects in accordance with a quantity of synchronization objects in use by the threads.

7. The system of claim 6, where, in being programmed to change over time the deployment state between deployed and undeployed in response to requests by the threads to deploy and undeploy the synchronization objects, the processor is programmed to, for each deployment of a synchronization object from the synchronization object pool:
receive a request from a thread to use the synchronization object from the synchronization object pool;
update the deployment state of the synchronization object to deployed; and
independently change the acquisition state of the synchronization object between locked and unlocked as the thread acquires and releases the synchronization object.

8. The system of claim 6, where the processor is further programmed to maintain a pool management data structure comprising, for each allocated synchronization object within the synchronization object pool:
a deployment state indicator that identifies the deployment state of the respective allocated synchronization object as one of deployed and undeployed; and
an acquisition state indicator that identifies the acquisition state of the respective allocated synchronization object as one of locked and unlocked.

9. The system of claim 6, where the processor is further programmed to dynamically adjust a number of deployment state indicators within a pool management data structure during the runtime responsive to adjusting during the runtime the allocated number of synchronization objects within the synchronization object pool, where the adjusted number of deployment state indicators within the pool management data structure correlates with the adjusted number of synchronization objects within the synchronization object pool.

10. A computer program product, comprising:
a computer readable storage medium having computer readable program code for managing synchronization object allocations within a multi-threaded execution environment embodied therewith, where the computer readable storage medium is not a transitory signal per se and where the computer readable program code when executed on a computer causes the computer to:
predict a number of synchronization objects simultaneously usable during runtime by a plurality of threads within the multi-threaded execution environment, comprising the computer readable program code when executed on the computer causing the computer to:
analyze code of at least one application;
determine a maximum number of synchronization objects per thread in accordance with an identified maximum number of synchronization objects per routine and a maximum depth of a call chain comprising each routine within the at least one application; and
predict the number of synchronization objects in accordance with the determined maximum number of synchronization objects per thread and a determined number of threads simultaneously executable within the at least one application;
the computer readable program code when executed on the computer further causing the computer to:
allocate a synchronization object pool comprising the predicted number of synchronization objects, each initialized with a deployment state of undeployed and an acquisition state of unlocked;

change over time the deployment state between deployed and undeployed in response to requests by threads to deploy and undeploy the synchronization objects, where the acquisition state is independently controlled as the synchronization objects are acquired and released by the threads; and adjust during the runtime the allocated number of synchronization objects within the synchronization object pool in response to determined deployment rates of the allocated number of synchronization objects, comprising the computer readable program code when executed on the computer causing the computer to iteratively adjust the allocated number of synchronization objects within the synchronization object pool over time to increase and decrease, respectively, the allocated number of synchronization objects in accordance with a quantity of synchronization objects in use by the threads.

11. The computer program product of claim 10, where, in causing the computer to change over time the deployment state between deployed and undeployed in response to requests by the threads to deploy and undeploy the synchronization objects, the computer readable program code when executed on the computer causes the computer to, for each deployment of a synchronization object from the synchronization object pool:

receive a request from a thread to use the synchronization object from the synchronization object pool;

update the deployment state of the synchronization object to deployed; and independently change the acquisition state of the synchronization object between locked and unlocked as the thread acquires and releases the synchronization object.

12. The computer program product of claim 10, where the computer readable program code when executed on the computer further causes the computer to maintain a pool management data structure comprising, for each allocated synchronization object within the synchronization object pool, a deployment state indicator that identifies the deployment state of the respective allocated synchronization object as one of deployed and undeployed.

13. The computer program product of claim 12, where the computer readable program code when executed on the computer further causes the computer to maintain within the pool management data structure, for each allocated synchronization object within the synchronization object pool, an acquisition state indicator that identifies the acquisition state of the respective allocated synchronization object as one of locked and unlocked.

14. The computer program product of claim 10, where the computer readable program code when executed on the computer further causes the computer to dynamically adjust a number of deployment state indicators within a pool management data structure during the runtime responsive to adjusting during the runtime the allocated number of synchronization objects within the synchronization object pool, where the adjusted number of deployment state indicators within the pool management data structure correlates with the adjusted number of synchronization objects within the synchronization object pool.

* * * * *